United States Patent Office 3,122,570
Patented Feb. 25, 1964

3,122,570
TRIAZOALKYL ETHERS
Harry A. Stansbury, Jr., John A. Durden, Jr., and William H. Catlette, South Charleston, W. Va., assignors to Union Carbide Corporation, a corporation of New York
No Drawing. Filed Apr. 29, 1960, Ser. No. 25,551
8 Claims. (Cl. 260—349)

This invention relates to triazoalkyl ethers and to a proces for their preparation.

Compounds containing one or more triazo radicals, i.e. —$N_3$ radicals, are useful as explosives, blowing agents, rocket fuels, chemical intermediates, and the like. This invention provides a novel class of triazo compounds having utility as stated above, and also provides a novel process for their preparation. The novel triazo compounds of the invention are the triazoalkyl ethers which are represented by the formula:

(I)
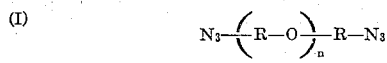

wherein each R individually represents a divalent saturated aliphatic hydrocarbon radical having from one to six carbon atoms, and preferably from two to three carbon atoms, and $n$ represents an integer having a value of from one to ten, and preferably from one to four.

The triazoalkyl ethers structurally depicted above are prepared by contacting the corresponding haloalkyl ether with an alkali metal azide. This process can be represented by the equation:

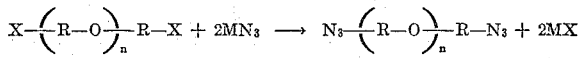

wherein X represents a halo radical, and preferably a chloro radical, each R individually represents a divalent saturated aliphatic hydrocarbon radical having from one to six carbon atoms, and preferably from two to three carbon atoms, $n$ represents an integer having a value of from one to ten and preferably from one to four, and M represents an alkali metal, preferably sodium.

Accordingly, it is an object of this invention to provide novel triazoalkyl ethers. It is another object of the invention to provide novel bis(triazoalkyl) ethers. A further object of the invention is to provide novel bis(triazo-oxyalkylene) ethers. A still further object of this invention is to provide novel bis[triazo(polyoxyalkylene)] ethers. It is a still further object of this invention to provide a novel process for the preparation of the novel triazoalkyl ethers mentioned above. Other objects of the invention will be apparent to those skilled in the art upon referring to the detailed description which follows.

The haloalkyl ethers employed in the process of the invention have the formula:

(II)
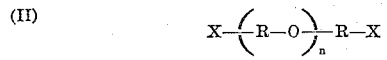

wherein X represents a halo radical, and preferably a chloro radical, each R individually represents a divalent saturated aliphatic hydrocarbon radical having from one to ten carbon atoms, and preferably from two to three carbon atoms, and $n$ represents an integer having a value of from one to ten, and preferably from one to four. These haloalkyl ethers can be prepared by methods which are well known in the art.

Examples of haloalkyl ethers which can be employed include bis(chloromethyl) ether, bis(2-chloroethyl) ether, bromomethyl 2-bromomethyl ether, bis(2-iodoethyl) ether, 2-chloro-1-methylethyl 2-chloroethyl ether, bis(2-chloro-1-methylethyl) ether, 2-chloropropyl 2-chloroethyl ether, bis(2-iodo-1-methylethyl) ether, bis(2-chloropropyl) ether, 4-bromobutyl 2-bromoethyl ether, bis(4-chlorobutyl) ether, bis(5-chloropentyl) ether, bis(2-chloro-1,1-dimethylethyl) ether, bis(6-bromohexyl) ether, the di(2-chloroethyl) ether of ethylene glycol, the di(2-bromoethyl) ether of diethylene glycol, the di(2-iodoethyl) ether of triethylene glycol, the di(2-chloroethyl) ether of hexaethylene glycol, the di(2-chloroethyl) ether of octaethylene glycol, the di(2-chloropropyl) ether of 1,2-propanediol, the di(2-chloropropyl) ether of dipropylene glycol, and the like.

The alkali metal azides employed in the process of this invention are, for example, lithium azide, sodium azide, potassium azide, and the like. Sodium azide is preferred.

The novel triazoalkyl ethers provided by this invention are represented by Formula I, supra. These triazoalkyl ethers can be further subdivided into three classes, which are (a) The bis(triazoalkyl) ethers, as represented by the formula

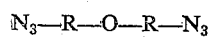

wherein each R individually represents a divalent saturated aliphatic hydrocarbon, having from one to six, and preferably from two to three carbon atoms;

(b) The bis(triazooxyalkylene) ethers, as represented by the formula

wherein each R individually is as defined above; and (c) The bis[triazo(polyoxyalkylene)] ethers, as represented by the formula

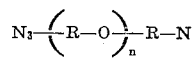

wherein each R individually is as defined above and $n$ is an integer with a value of from three to ten.

Illustrative —R— groups include methylene, ethylene, propylene, 1-methylethylene, butylene, 1-methylpropylene, pentylene, hexylene, and the like.

Representative triazoalkyl ethers are, for example, bis(triazomethyl) ether, bis(2-triazoethyl) ether, triazomethyl 2-triazoethyl ether, 2-triazo-1-methylethyl 2-triazoethyl ether, 2-triazopropyl 2-triazoethyl ether, bis(2-triazo-1-methylethyl) ether, bis(2-triazopropyl) ether, 4-triazobutyl 2-triazoethyl ether, bis(4-triazobutyl) ether, bis(5-triazopentyl) ether, bis(2-triazo-1, 1-dimethylethyl) ether, bis(6-triazohexyl) ether, the di(2-triazoethyl) ether of ethylene glycol, the di(2-triazoethyl) ether of diethylene glycol, the di(2-triazoethyl) ether of triethylene glycol, the di(2-triazoethyl) ether of hexaethylene glycol, the di(2-triazoethyl) ether of octaethylene glycol, the di(2-triazoethyl) ether of decaethylene glycol, the di(2-triazopropyl) ether of 1,2-propanediol, the di(2-triazopropyl) ether of dipropylene glycol, and the like.

The reactants, i.e., alkali metal azide and haloalkyl ether, can be employed in proportions varying over a wide range. Generally, however, it is advantageous to employ a slight stoichiometric excess of alkali metal azide in order to effect essentially complete reaction. A suitable proportion is from about 2 moles of alkali metal azide per mole of haloalkyl ether to about 5 moles, and higher, of alkali metal azide per mole of haloalkyl ether. A proportion of from about 2.1 to about 2.5 moles of alkali metal azide per mole of haloalkyl ether is preferred.

It is frequently advantageous to carry out the reaction in an inert, normally-liquid organic vehicle. When employing a chloroalkyl ether as the starting material in the process of this invention, it is particularly advantageous to employ a polar organic solvent as the reaction medium. Polar solvents which have been found especially useful include the N,N-lower alkyl-substituted amides such as dimethylformamide, diethylformamide, N,N-dimethylacetamide, N,N-diethylacetamide, and N,N-dipropylacetamide; and the lower alkyl-substituted sulfoxides such as dimethylsulfoxide, diethylsulfoxide, and diisopropylsulfoxide; lower alkyl-substituted ureas such as tetramethylurea and tetraethylurea; lower alkyl-substituted nitriles such as acetonitrile, propionitrile, n-butyronitrile, and isobutyronitrile; water-miscible organic solvents such as aqueous "Carbitol," aqueous ethanol, and aqueous dioxanes; lower alkyl ethers such as diethyl ether, dipropyl ether, and dibutyl ether; and the like. The preferred solvent is dimethylformamide.

The reaction can be carried out over a wide temperature range, although elevated temperatures are preferred. A suitable temperature range is from about 45° C., and lower, to about 200° C., and higher. A temperature range of from about 80° C. to about 130° C. is preferred. The pressure at which the reaction is carried out is preferably essentially atmospheric, although pressures up to about 500 p.s.i.g. can be employed if necessary to maintain the reactants, product or solvent in a liquid state.

The reaction time will depend upon various factors, such as temperature, nature of reactants, reaction medium, and the like. A suitable reaction time is from about 2 hours, and lower, to about 75 hours, and higher. A reaction time of from about 15 hours to about 30 hours is preferred.

The reaction can be carried out as a batch, semi-continuous, or continuous operation. Conventional apparatus constructed from standard materials are suitable.

The product can be recovered by conventional methods, for example, filtration to remove the salt formed during the reaction, followed by fractional distillation to separate the triazo-alkyl ether from the reaction medium and from any unreacted starting material.

Modifications of the invention will be apparent and are included within the invention as defined by the claims.

The following non-limiting examples serve to illustrate the invention.

EXAMPLE 1

A mixture of 650 grams of sodium azide (10.0 moles) in 1600 ml. of dimethylformamide was stirred at 100° C. while 684.4 grams of bis(2-chloroethyl) ether (4.8 moles) were added over a period of two hours. After the mixture was stirred at 100° C. for 17 more hours, it was chilled in an ice bath and filtered to remove the sodium chloride formed during the reaction. The filtrate was diluted with 150 ml. of triethylene glycol to serve as a distillation residue, and fractionated under reduced pressure to yield 698 grams of bis(2-triazoethyl) ether. The product had the following properties:

Boiling point at 2.5 mm. of mercury____ 75° C.
Refractive index, $n$ 30/D_____ 1.4705.
Specific gravity, 20/20°_____ 1.1560.
Elemental analysis (percent nitrogen)___ Found (Dumas) 54.1%, theory 53.83%.

EXAMPLE 2

A slurry of 439.4 grams of sodium azide (6.76 moles) in 1000 ml. of dimethylformamide was stirred at 100° C. while 550 grams of bis(2-chloro-1-methylethyl) ether (3.22 moles) were added over a period of 30 minutes. After stirring for 67 hours at 100° C., the mixture was cooled and filtered to remove sodium chloride. The filtrate was diluted with 40 grams of triethylene glycol and fractionated under reduced pressure. The products were readily separated, and consisted of (1) 210 grams of bis(2-triazo-1-methylethyl) ether and (2) 223 grams of 2-chloro-1-methylethyl 2-triazo-1-methylethyl ether.

|  | (1) | (2) |
|---|---|---|
| Boiling point | 78° C., 2 mm. Hg | 65° C., 3 mm. Hg. |
| $n$ 30/D | 1.4588 | 1.4516. |
| Sp. Gr. 20/20° | 1.077 |  |

The infrared absorption spectrums and mass spectrometric analyses supported the assigned structures. The elemental analysis of (1) was 45.5 percent N (theory 45.62), 39.07 percent C (theory 39.12) and 6.56 percent H (theory 6.56).

EXAMPLE 3

A slurry of 144 grams of sodium azide (2.2 moles) in 300 ml. of dimethylformamide was stirred at 95° C. while 187 grams of 1,2-bis(2-chloroethoxy) ethane (1.0 mole) were added over a period of 2.25 hours. After stirring 48 additional hours at 95° C., the mixture was cooled in an ice bath and filtered to remove the salt. The filtrate was diluted with 50 ml. of triethylene glycol and fractionated under reduced pressure to yield 170 grams of 1,2-bis(2-triazoethoxy) ethane having the following properties:

Boiling point at 0.3 mm. of mercury_____° C__ 83
Refractive index, $n$ 28.5/D_____ 1.4672
Specific gravity, 20/20°_____ 1.144

*Elemental Analysis*

|  | Found, Percent | Theory, Percent |
|---|---|---|
| Carbon | 36.54 | 36.0 |
| Hydrogen | 6.19 | 6.0 |
| Nitrogen | 41.48 | 41.98 |

The infrared spectrum supported the assigned structure.

EXAMPLE 4

This example illustrates the utility of the triazoalkyl ethers provided by this invention as blowing agents for producing foamed structures from polyvinyl chloride. Three grams of bis-(2-triazoethyl) ether were dissolved in 27 grams of acetone, after which the solution was thoroughly chilled in Dry Ice. Twenty grams of this chilled solution were hand-mixed with 20 grams of a powdered polyvinyl chloride homopolymer having a reduced viscosity [1] of about 1.5. Twenty-one grams of this mixture were poured into a gasketed steel compression mold of 1¾ inch internal diameter, which was then closed with a gasketed piston. The contents of the mold were subjected to an initial pressure of approximately 1100 pounds per square inch by means of a hydraulic press, and were then heated to 160° C. for ten minutes by passage of steam through the press plates. The mold was then rapidly cooled to 25° C., the hydraulic pressure released, and the fused polyvinyl chloride was discharged as a flexible, opaque, amber-colored plaque of approximately 2¼ inch diameter. Upon heating the specimen in a 100° C. forced convection oven for fifteen minutes further expansion of the plaque occurred to produce a 6¼ x 1½ inch disk of foam of medium cell structure.

What is claimed is:

1. A triazoalkyl ether having the formula

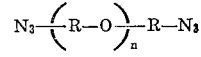

wherein each R individually represents a divalent saturated aliphatic hydrocarbon group having from one to six carbon atoms, and $n$ is an integer having a value of from one to four.

2. The triazoalkyl ether as defined in claim 1 wherein R represents ethylene.

---

[1] By the term "reduced viscosity" is meant a value obtained by dividing the specific viscosity by the concentration of the polymer in the solution, the concentration being measured in grams of polymer per 100 milliliters of solvent at a given temperature, and is regarded as measure of molecular weight. The specific viscosity is obtained by dividing the difference between the viscosity of the solution and the viscosity of the solvent by the viscosity of the solvent. Here, the reduced viscosity of the polyvinyl chloride was measured at 20° C. in nitrobenzene, and at a concentration of 0.2 gram of polyvinyl chloride per 100 milliliters of nitrobenzene.

3. The triazoalkyl ether as defined in claim 1 wherein each R represents propylene.
4. Bis(2-triazoethyl) ether.
5. Bis(2-triazo-1-methylethyl) ether.
6. 1,2-bis(2-triazoethoxy) ethane.
7. Bis(triazoalkyl) ether wherein the alkyl moieties thereof have from 1 to 6 carbon atoms.
8. Bis(triazoalkoxy)alkane wherein the alkoxy moieties thereof and the alkane moiety thereof individually have from 1 to 6 carbon atoms.

References Cited in the file of this patent

Ingold: Structure and Mechanism in Organic Chemistry, pages 352–5 (1953) (Cornell).
Bohme et al.: Chem. Berichte, vol. 89, pages 2869–72 (1956).